(12) United States Patent
Goda et al.

(10) Patent No.: US 12,243,993 B2
(45) Date of Patent: Mar. 4, 2025

(54) PROCESSING METHOD OF POSITIVE ELECTRODE ACTIVE SUBSTANCE WASTE OF LITHIUM ION SECONDARY BATTERY

(71) Applicant: JX Nippon Mining & Metals Corporation, Tokyo (JP)

(72) Inventors: Tomonari Goda, Hitachi (JP); Keisuke Yamada, Hitachi (JP); Nobuaki Okajima, Hitachi (JP)

(73) Assignee: JX METALS CIRCULAR SOLUTIONS CO., LTD., Tokyo (JP)

( * ) Notice: Subject to any disclaimer, the term of this patent is extended or adjusted under 35 U.S.C. 154(b) by 980 days.

(21) Appl. No.: 17/290,177

(22) PCT Filed: Oct. 25, 2019

(86) PCT No.: PCT/JP2019/042055
§ 371 (c)(1),
(2) Date: Apr. 29, 2021

(87) PCT Pub. No.: WO2020/090690
PCT Pub. Date: May 7, 2020

(65) Prior Publication Data
US 2022/0045375 A1 Feb. 10, 2022

(30) Foreign Application Priority Data

Oct. 31, 2018 (JP) .................................. 2018-206157

(51) Int. Cl.
*H01M 10/54* (2006.01)
*B09B 3/40* (2022.01)
(Continued)

(52) U.S. Cl.
CPC .............. *H01M 10/54* (2013.01); *B09B 3/40* (2022.01); *C22B 3/08* (2013.01); *C22B 3/10* (2013.01)

(58) Field of Classification Search
CPC . H01M 10/54; B09B 3/40; C22B 3/08; C22B 3/10; C22B 23/0423; C22B 23/043;
(Continued)

(56) References Cited

U.S. PATENT DOCUMENTS

2011/0135547 A1 6/2011 Kobayashi et al.

FOREIGN PATENT DOCUMENTS

| CA | 3 058 572 A1 | 10/2018 |
| CN | 107666022 A | 2/2018 |

(Continued)

OTHER PUBLICATIONS

International Preliminary Report on Patentability and English translation of the Written Opinion of the International Searching Authority (forms PCT/IB373, PCT/ISA/237 and PCT/IB/338), dated May 14, 2021, for corresponding International Application No. PCT/JP2019/042055.

(Continued)

*Primary Examiner* — Niki Bakhtiari
*Assistant Examiner* — Niara Trant
(74) *Attorney, Agent, or Firm* — Birch, Stewart, Kolasch & Birch, LLP (57) ABSTRACT

A method for processing positive electrode active material waste of lithium ion secondary batteries, the waste containing cobalt, nickel, manganese and lithium, the method including: a carbon mixing step of mixing the positive electrode active material waste in the form of powder with carbon to obtain a mixture having a ratio of a mass of carbon to a total mass of the positive electrode active material waste and the carbon of from 10% to 30%; a roasting step of roasting the mixture at a temperature of from 600° C. to 800° C. to obtain roasted powder; a dissolution step including a first dissolution process of dissolving lithium in the roasted powder in water or a lithium-containing solution, and a second dissolution process of dissolving the lithium in a residue obtained in the first dissolution process in water; and an acid leaching step of leaching a residue obtained in the lithium dissolution step with an acid.

14 Claims, 4 Drawing Sheets

(51) Int. Cl.
    *C22B 3/08* (2006.01)
    *C22B 3/10* (2006.01)
(58) Field of Classification Search
    CPC . C22B 23/0438; C22B 47/0063; Y02P 10/20; Y02W 30/84
    See application file for complete search history.

(56) References Cited

FOREIGN PATENT DOCUMENTS

| | | | |
|---|---|---|---|
| JP | 2010-180439 | A | 8/2010 |
| JP | 4581553 | B2 | 11/2010 |
| JP | 2011-94227 | A | 5/2011 |
| JP | 2011-94228 | A | 5/2011 |
| JP | 2014-55312 | A | 3/2014 |
| JP | 5535717 | B2 | 7/2014 |
| JP | 5706457 | B2 | 4/2015 |

OTHER PUBLICATIONS

International Search Report for PCT/JP2019/042055 (PCT/ISA/210) mailed on Dec. 17, 2019.
Extended European Search Report for corresponding European Application No. 19878238.5, dated Jul. 15, 2022.
Liu et al., "Study on the reduction roasting of spent $LiNi_xCo_yMn_zO_2$ lithium-ion battery cathode materials," Journal of Thermal Analysis and Calorimetry, vol. 136, 2019 (Published online Oct. 3, 2018), pp. 1323-1332.
Perry et al., "Perry's Chemical Engineers' Handbook," McGrawHill, Jan. 1, 1997, 12 pages total.

PROCESSING METHOD OF POSITIVE ELECTRODE ACTIVE SUBSTANCE WASTE OF LITHIUM ION SECONDARY BATTERY

FIELD OF THE INVENTION

This specification discloses a technique relating to a method for processing positive electrode active material waste containing cobalt, nickel, manganese and lithium in lithium ion secondary batteries.

BACKGROUND OF THE INVENTION

In recent years, it has been widely studied for recovery of valuable metals such as nickel and cobalt from lithium ion secondary battery waste and the like discarded for expired product life or other reasons by means of wet processing or the like, in terms of effective utilization of resources.

For example, in order to recover valuable metals from lithium ion secondary battery waste, the lithium ion secondary battery waste is typically calcined and then subjected to crushing and sieving in this order. Subsequently, battery powder obtained under a sieve for the sieving is leached by adding it to an acidic leaching solution, whereby lithium, nickel, cobalt, manganese, iron, copper, aluminum and the like which can be contained therein are dissolved in the solution.

Subsequently, iron, copper, aluminum and the like are sequentially or simultaneously removed from various metal elements dissolved in the leached solution by solvent extraction or neutralization at a plurality of stages, and valuable metals such as nickel, cobalt, manganese and lithium are separated and concentrated by solvent extraction to obtain a solution containing each metal. The solution containing nickel and cobalt is subjected to electrolysis or the like to recover each metal (see, for example, Patent Literatures 1 to 3). A carbonic acid source is added to the solution containing manganese or lithium to recover it as a carbonate.

The lithium-containing solution thus obtained is subjected to concentration of lithium ions by repeating solvent extraction or the like, and then carbonation by adding a carbonate salt or blowing a carbon dioxide gas to recover a lithium ion contained in the lithium-containing solution as lithium carbonate, as described in Patent Literature 4 and the like.

By the way, some lithium ion secondary batteries contain lithium and a positive electrode active material containing cobalt, nickel and manganese as a so-called ternary positive electrode material in the form of composite metal oxide. Waste of such a positive electrode active material may also contain impurities in addition to these metals, and various metals would be recovered from the waste in substantially the same manner as that of the processing for the lithium ion secondary battery waste as described above.

Thus, when lithium carbonate is recovered by carbonation from the finally obtained lithium-containing solution after carrying out various processes such as acid leaching and solvent extraction as described above, there are problems that processes to obtain lithium carbonate are extremely complicated, thereby increasing costs of processing and equipment, resulting in poor processing efficiency.

In connection with this, Patent Literature 5 proposes "a method for recovering lithium, comprising leaching a roasted product containing lithium oxide in water, the roasted product being obtained by roasting a mixture of one part by mass or more of carbon with 100 parts by mass of lithium cobalt oxide in any of an air atmosphere, an oxidizing atmosphere, and a reducing atmosphere". It also discloses that according to this method, "it is possible to provide a lithium recovery method capable of efficiently recovering lithium from lithium cobalt oxide which is a positive electrode material for lithium ion secondary batteries, and of recycling the lithium ion secondary battery".

CITATION LIST

Patent Literatures

[Patent Literature 1] Japanese Patent Application Publication No. 2010-180439 A
[Patent Literature 2] U.S. Patent Application Publication No. 2011/0135547 A1
[Patent Literature 3] Japanese Patent No. 5706457 B
[Patent Literature 4] Japanese Patent No. 4581553 B
[Patent Literature 5] Japanese Patent No. 5535717 B

SUMMARY OF THE INVENTION

Technical Problem

The mixing of the positive electrode active material waste with carbon as described in Patent Literature 5 and roasting of the mixture promotes decomposition of the composite metal oxides in the positive electrode active material waste. It is, therefore, effective in that lithium in the roasted powder obtained after roasting can be effectively dissolved in water.

However, it is difficult to mention that Patent Literature 5 sufficiently considers a preferable ratio of the positive electrode active material waste and carbon mixed before roasting and an appropriate roasting temperature, in the processing of the ternary positive electrode active material waste.

Further, even if a large amount of lithium in the roasted powder can be created in the form of capable of dissolving water by roasting, the lithium becomes saturated in the solution as the dissolution of the lithium proceeds, leading to further difficulty to dissolve the lithium, when the lithium in the roasted powder is dissolved in water. In this case, there are problems that the lithium remains in the residue after dissolution and a recovery rate of lithium is decreased.

To address the above problems, the present disclosure provides a method for processing positive electrode active material waste of lithium ion secondary batteries, which can effectively recover lithium contained in the positive electrode active material waste containing cobalt, nickel, manganese and lithium from the waste.

Solution to Problem

The method for processing positive electrode active material waste disclosed herein is a method for processing positive electrode active material waste of lithium ion secondary batteries, the waste containing cobalt, nickel, manganese and lithium, the method comprising: a carbon mixing step of mixing the positive electrode active material waste in the form of powder with carbon to obtain a mixture having a ratio of a mass of carbon to a total mass of the positive electrode active material waste and the carbon of from 10% to 30%; a roasting step of roasting the mixture at a temperature of from 600° C. to 800° C. to obtain roasted powder; a dissolution step including a first dissolution process of dissolving lithium in the roasted powder in water or a lithium-containing solution, and a second dissolution process of dissolving the lithium in a residue obtained in the first dissolution process in water; and an acid leaching step of leaching a residue obtained in the lithium dissolution step with an acid.

Advantageous Effects of Invention

According to the method for processing positive electrode active material waste containing cobalt, nickel, manganese and lithium, the lithium can be effectively recovered from the positive electrode active material waste.

DETAILED DESCRIPTION OF THE INVENTION

Hereinafter, embodiments of the invention disclosed in this specification will be described in detail with reference to the drawings.

Figure 1:
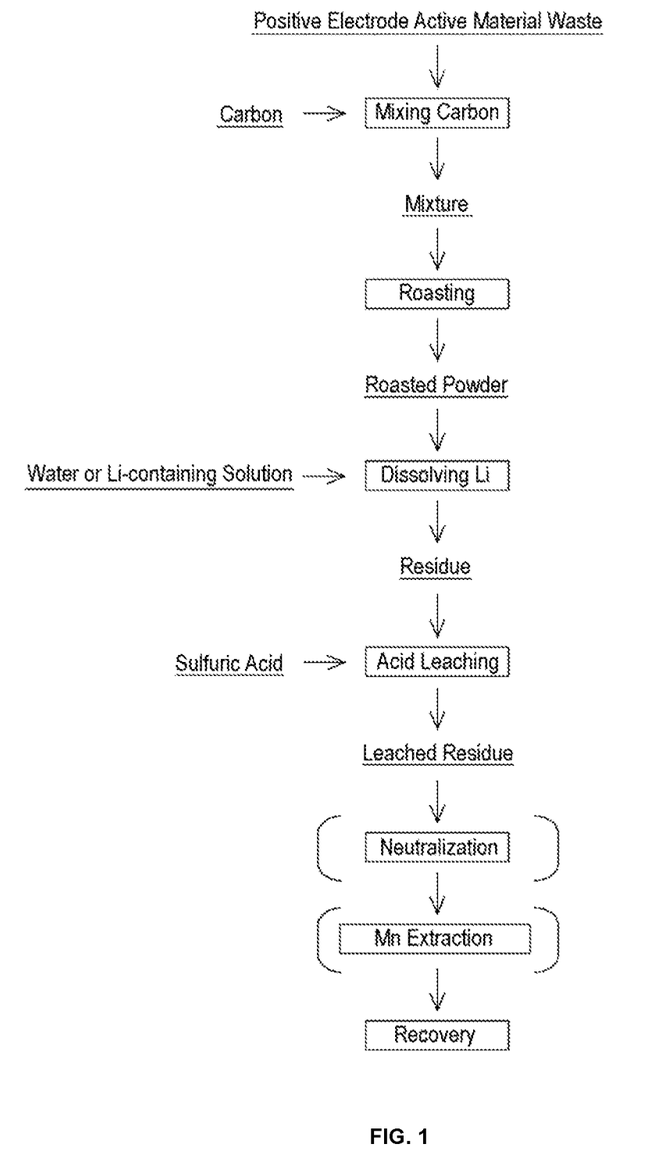
FIG. 1 is a flow chart showing a method for processing positive electrode active material waste according to an embodiment.
Figure 2:
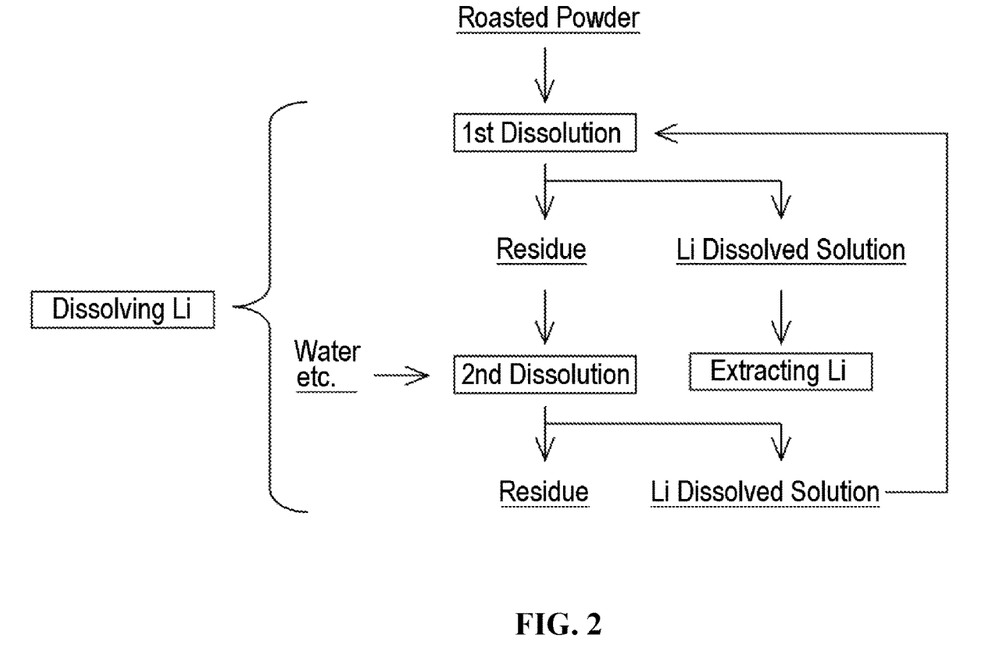
FIG. 2 is a flow chart showing details of a lithium dissolution step in the processing method of FIG. 1.

FIG. 1 shows an embodiment of a method for processing positive electrode active material waste of lithium ion secondary batteries, the waste containing cobalt, nickel, manganese, and lithium. This embodiment includes: a carbon mixing step of mixing the positive electrode active material waste in the form of powder with carbon to obtain a mixture of positive positive material active material waste and the carbon; a roasting step of roasting the mixture to obtain roasted powder; a lithium dissolution step of dissolving lithium in the roasted powder in water or the like; and an acid leaching step of leaching the residue obtained in the lithium dissolution step with an acid. Among them, the lithium dissolution step includes at least a first dissolution process of dissolving lithium in the roasted powder in water or an acidic solution or a lithium-containing solution, and a second dissolution process of leaching the lithium in the residue obtained in the first dissolution process into water or an acidic solution, as illustrated in FIG. 2
(Positive Electrode Active Material Waste)

The positive electrode active material waste is, for example, positive electrode active materials and the like of lithium ion secondary batteries which can be used in various electronic devices such as mobile phones, which have been discarded due to manufacturing defects. Alternatively, it may be the positive electrode active materials taken out from the lithium ion secondary batteries discarded due to the life of the product or other reasons, but the positive electrode active material waste is preferably not roasted yet. This is because the unroasted positive electrode active material waste is subjected to a carbon mixing step and a roasting step as described later in this order, whereby the metals contained therein can be effectively changed into a form where it is easily dissolved or leached. The recovery of lithium from such positive electrode active material waste is preferred in terms of effective utilization of resources.

The positive electrode active materials are used in a state of being fixed to aluminum foils with a binder. When the positive electrode active materials with the aluminum foils are roasted, it is concerned that aluminum is melted at its melting point of 660° C. and lithium reacts with aluminum to result in a form that is difficult to be dissolved in water as lithium aluminate. Therefore, the unroasted positive electrode active materials with aluminum foils are crushed or pulverized in advance to peel off the positive electrode active materials from the aluminum foils, and aluminum having a larger particle size is separated by sieving to form positive electrode active material waste in the form of powder.

Here, in this embodiment, the powdery positive electrode active material waste containing at least cobalt, nickel, manganese, and lithium, so-called ternary positive electrode active material waste, is targeted. Such cobalt, nickel, manganese and lithium can generally be contained in the positive electrode active material waste as a composite metal oxide of these metals ($LiNi_xCo_yMn_zO_2$).

A content of cobalt in the positive electrode active material waste is, for example, from 0% by mass to 60% by mass, and typically from 20% by mass to 30% by mass. A content of nickel is, for example, from 0% by mass to 60% by mass, and typically from 20% by mass to 30% by mass. A content of manganese is, for example, from 0% by mass to 40% by mass, and typically from 0% by mass to 20% by mass. A content of lithium content is, for example, from 2% by mass to 8% by mass, and typically from 3% to 7% by mass.

The cobalt, nickel, manganese and lithium as described above usually form a major part of the positive electrode active material waste. However, due to various circumstances, the positive electrode active material waste may contain impurities other than those cobalt, nickel, manganese and lithium. Examples of the impurities include at least one selected from the group consisting of aluminum, iron, copper and fluorine. However, the content of the impurities in the positive electrode active material waste is, for example, 30% by mass or less, and typically 10% by mass or less, in total when a plurality of types of elements are contained. It is considered that fluorine may be contained as a binder component. In the positive electrode active materials with aluminum foils, the quality of aluminum may be from 5% by mass to 20% by mass, and the quality of fluorine may be from 5% by mass to 10% by mass.
(Carbon Mixing Step)

In the carbon mixing step, the above positive electrode active material waste is mixed with carbon to obtain a mixture. As a result, when the mixture is roasted at an appropriate temperature in the subsequent roasting step, carbon is combined with oxygen in the positive electrode active material waste to generate carbon monoxide and carbon dioxide, and the gases are combined with lithium oxide generated by decomposition of the positive electrode active material waste to produce lithium carbonate. The lithium carbonate can be easily dissolved in water or the like.

A predetermined amount of carbon is preferably added to the positive electrode active material waste to obtain a mixture such that a ratio of a mass of carbon to a total mass of the positive electrode active material waste and the carbon in the mixture is from 10% to 30%. This is because if the mass ratio of carbon in the mixture is less than this range, the positive electrode active material will not decompose and a water leaching rate of lithium will decrease, while if it is higher, a leaching residue will be generated when nickel cobalt is dissolved in the subsequent sulfuric acid leaching step. From this viewpoint, the ratio of the mass of carbon to the total mass of positive electrode active material waste and the carbon in the mixture is preferably from 10% to 30%.

The carbon to be mixed with the positive electrode active material waste can have an average particle size of from 30 μm to 500 μm. If the particle size of carbon is too high, a reaction efficiency may be decreased.

The material to be mixed with the positive electrode active material waste is not particularly limited as long as it is a substance containing carbon. It may also contain substances other than carbon, and for example, can be graphite, coke, carbon powder, activated carbon, or charcoal.

When mixing the positive electrode active material waste with the carbon, for example, these can be fed from a hopper containing each raw material into a powder mixer, a drum mixer or the like through a screw feeder, and mix them therein.

(Roasting Step)

The mixture of the positive electrode active material waste and the carbon obtained as described above is subjected to the roasting step. Herein, the mixture is roasted at a temperature of 600° C. to 800° C., thereby obtaining roasted powder. The roasting temperature in this range can allow the carbon in the mixture as described above to be utilized to promote a reaction such as $2LiCoO_2$ (s)+C (s)+$1/2O_2$ (g)→$2CoO$ (s)+$Li_2CO_3$ (s), thereby effectively decomposing the composite metal oxide contained in the positive electrode active material waste. In the roasting step, a large amount of cobalt can be in the form of cobalt oxide (CoO) or simple substance cobalt which will be easily leached with an acid. Also, nickel may be converted from $LiNiO_2$ to simple substance nickel, and manganese may be converted from $LiMnO_2$ and $LiMn_2O_4$ to simple substance manganese.

The reaction herein would be $2LiCoO_2$ (s)+C (s)→$2Co$ (s)+$Li_2CO_3$ (s), $2LiCoO_2$ (s)+C (s)→$2CoO$ (s)+$Li_2O$ (s)+CO (g), $2LiCoO_2$ (s)+CO (g)→Co (s)+CoO (s)+$Li_2O$ (s)+$CO_2$ (g), $Li_2O$ (s)+$CO_2$ (g)→$Li_2CO_3$ (s), and the like.

As will be described in detail later, such a roasting step can allow lithium to be effectively dissolved in the lithium dissolution step, and various metals to be leached with an acid with a decreased amount of expensive hydrogen peroxide used or without using hydrogen peroxide in the acid leaching step.

A higher temperature is effective for the decomposition reaction of the positive electrode active material. From this point of view, the roasting temperature is more preferably from 500° C. to 700° C. Lithium carbonate produced by the decomposition reaction of the positive electrode active material has a melting point of about 720° C. Therefore, if the roasting temperature is too high, the solution of lithium carbonate flows out from the powder, resulting in difficulty to handle.

A roasting time is preferably 120 minutes or longer, and more preferably 240 minutes or longer. If the roasting time is shorter, the reaction may not sufficiently take place.

The roasting step is preferably carried out using a roasting pot that can be placed in a saggar and heated at a constant temperature. The roasting step can be carried out by using various heating equipment such as a rotary kiln furnace or other various furnaces, and a furnace for heating in an air atmosphere.

(Lithium Dissolution Step)

In the lithium dissolution step, the roasted powder as described above is brought into contact with water or a lithium-containing solution to dissolve the lithium contained in the roasted powder in water or the lithium-containing solution. This can allow a lithium solution containing lithium ions and having a sufficiently low concentration of other metal ions to be obtained.

Lithium in the roasted powder that has undergone the roasting step as described above dissolves in water, but other metals hardly dissolve. Therefore, the lithium can be effectively separated from the roasted powder. By dissolving lithium carbonate in water, the solution becomes alkaline (pH 11 to pH 12), and nickel, cobalt, manganese and the like will not be dissolved in the solution in which lithium is leached with water.

In this embodiment, as shown in FIG. 2, the lithium dissolution step includes at least a first dissolution process of dissolving lithium in the roasted powder in water or the lithium-containing solution, and a second dissolution process of dissolving lithium in the residue obtained in the first dissolution step in water.

By dissolving lithium in the roasted powder in water or the like in the first dissolution process, a lithium solution in which lithium carbonate or the like in the solution is saturated can be obtained. Accordingly, when carrying out steps such as extraction of lithium from the lithium solution as a saturated solution, any load on the steps can be reduced.

However, since the residue obtained by solid-liquid separation in the first dissolution process may further contain lithium, the second dissolution process of dissolving lithium in the residue in water is carried out. This can lead to improvement of a recovery rate of lithium. If lithium remains in the residue obtained by solid-liquid separation after the second dissolution step, a third dissolution process of dissolving the lithium in the residue in water can be further carried out as needed. That is, it is possible to repeat one or more of the same dissolution process as the second dissolution process.

The first dissolution process is preferably continued until the lithium concentration in the solution reaches 2 g/L or more. This is because if the first dissolution process is terminated before the lithium concentration reaches 2 g/L, an amount of the solution to be fed to the lithium extraction step which is a subsequent step may be increased, leading to a large equipment scale. More preferably, the first dissolution process is continued until the lithium concentration in the solution reaches 2.2 g/L or more.

Specific examples of the water to be brought into contact with the roasted powder or the residue include tap water, industrial water, distilled water, purified water, ion-exchanged water, pure water, ultrapure water and the like.

In the first dissolution process, a lithium-containing solution in which lithium is dissolved in the above water can also be used. As illustrated in FIG. 2, the lithium-containing solution is preferably a lithium dissolved solution obtained in the second dissolution process or the subsequent dissolution process in the lithium dissolution step. The lithium dissolved solution obtained in the second dissolution process or the subsequent dissolution process is a solution of lithium that could not be completely dissolved in the first dissolution process, and there is still room for dissolving lithium. Therefore, the subjecting of this solution to the dissolution of lithium in the roasted powder in the first dissolution process can increase the concentration of lithium in the solution.

A method of bringing the roasted powder or residue into contact with water or the like include various methods such as sprinkling, immersing, and dipping. A method of immersing the battery powder in water or the like and stirring it is preferred, in terms of a reaction efficiency.

A liquid temperature during the contact between the roasted powder or the residue and water or the like can be from 10° C. to 60° C. The lower the liquid temperature, the higher the solubility of lithium carbonate. Therefore, it is preferable that the liquid temperature is lower. A pulp concentration can be from 50 g/L to 150 g/L. The pulp concentration means a ratio of a dry weight (g) of the roasted powder or residue to an amount (L) of water or the like to be brought into contact with the roasted powder or residue.

In the first dissolution process, a dissolution rate of lithium in water or the like is preferably from 50% to 100%, and even more preferably from 70% to 100%.

The lithium concentration in the lithium solution obtained in the first dissolution process is preferably from 1.0 g/L to 2.5 g/L, and more preferably from 2.0 g/L to 2.5 g/L. In addition, the lithium dissolved solution may contain elements other than lithium, and for example, a sodium concentration in the lithium solution may be from 0 mg/L to 1000 mg/L, and an aluminum concentration may be from 0 mg/L to 500 mg/L.

As will be described later, the remaining residue finally obtained in the lithium melting step can be subjected to an acid leaching step, an Mn extraction step, a Co recovery step, a Ni recovery step and the like to recover various metals contained therein.

On the other hand, the lithium dissolved solution obtained in the first dissolution process in the lithium dissolution step can be subjected to processes such as lithium concentration, carbonation, and purification by known methods to obtain lithium carbonate. Alternatively, lithium hydroxide may be recovered. Here, any detailed description of the lithium solution will be omitted.

(Acid Leaching Step)

In the acid leaching step, the residue obtained in the above lithium dissolution step is added to an acidic solution such as sulfuric acid and leached therein. Here, since the Co component in the residue is effectively converted to cobalt oxide (CoO) and simple substance cobalt by the above roasting step, the Co component can be easily dissolved in the acidic solution.

The acid leaching step can be carried out by a known method or conditions. It is preferable that a pH of the acidic solution is from 0 to 2.0, and a oxidation-reduction potential (ORP value, silver/silver chloride potential reference) of the acidic solution is 0 mV or less.

(Neutralization Step)

A leached solution obtained in the acid leaching step can be subjected to a neutralization step of increasing a pH of the leached solution, whereby aluminum in the leached solution can be precipitated and then subjected to solid-liquid separation to remove aluminum. However, the neutralization step can be omitted depending on predetermined conditions where the leached solution does not contain aluminum, and the like, for example.

In the neutralization step, the pH is preferably increased in the range of from 4.0 to 6.0. If the pH is too low, Al cannot be sufficiently precipitated. On the other hand, if the pH is too high, other metals such as Co are also precipitated. From the viewpoint, the pH in the neutralization step is more preferably from 4.0 to 6.0, and even more preferably from 4.5 to 5.0.

In the neutralization step, for example, an alkali such as sodium hydroxide, sodium carbonate, and ammonia can be added to increase the pH in the range as defined above.

In the neutralization step, the ORP value (ORPvsAg/AgCl) is preferably from −500 mV to 100 mV, and more preferably from −400 mV to 0 mV. If the ORP value at this time is too high, Co may be precipitated as tricobalt tetroxide ($Co_3O_4$). On the other hand, if the ORP value is too low, it is concerned that Co is reduced into a single substance metal (Co metal) and precipitated.

In the neutralization step, the solution temperature is preferably from 50° C. to 90° C., and more preferably from 60° C. to 90° C. That is, if the solution temperature is less than 50° C., there is a concern that the reactivity may be deteriorated, and if it is higher than 90° C., an apparatus capable of withstanding high temperature is required, as well as it is not preferable in terms of safety.

Here, when the solid-liquid separation after the acid leaching in the acid leaching step is omitted, the carbon that can mixed in the carbon mixing step and contained in the solution may also be separable by solid-liquid separation. Therefore, in this case, for example, the solid-liquid separation in the acid leaching step can be omitted to achieve improvement of a processing efficiency and reduction of cost.

A molar ratio of Li to Al (Li/Al ratio) in the leached solution obtained in the acid leaching step as described above is preferably 1.1 or more in terms of improving filterability of the precipitate in the neutralization step. In this case, Al contained in the precipitate in the neutralization step generates gel-like $Al(OH)_3$, as well as composite oxides and composite hydroxides such as crystalline $LiAlO_2$ and $LiAl_2(OH)_7$, which have forms close to powder. Such a precipitate is easily filtered during solid-liquid separation, so that the time required for filtration during the solid-liquid separation in the neutralization step can be shortened.

In the neutralization step, a part of Al contained in the leached solution is typically removed. Here, if all Al is to be removed, cobalt and nickel are also removed by coprecipitation, resulting in loss. Therefore, a condition for thoroughly removing Al is not intended. Thus, the residue of the Al will remain in a dissolved state in the separated solution. The residue of Al can be removed in the next Mn extraction step. An Al concentration after the neutralization step is generally from 0.1 g/L to 1.0 g/L, typically from 0.3 g/L to 0.8 g/L.

(Mn Extraction Step)

After the acid leaching step or the neutralization step when the neutralization step is carried out, solvent extraction is carried out to extract manganese and optionally the residue of aluminum from the leached solution. In this case, manganese and the residue of aluminum is extracted to obtain a Mn extracted solution as an extraction residual liquid (an aqueous phase) from which they have been removed.

More specifically, it is preferable to use a mixed extracting agent containing a phosphate ester-based extracting agent and an oxime-based extracting agent for the leached solution.

Here, examples of the phosphate ester-based extracting agent include di-2-ethylhexylphosphoric acid (trade name: D2EHPA or DP8R). The oxime-based extracting agent is preferably aldoxime or based on aldoxime. Specific examples include 2-hydroxy-5-nonylacetophenone oxime (trade name: LIX84), 5-dodecyl salicylaldoxime (trade name: LIX860), a mixture of LIX84 and LIX860 (trade name: LIX984), 5-nonyl salicylaldoxime (trade name: ACORGAM5640) and the like, among which 5-nonyl salicylaldoxime is preferable in terms of price and the like.

In the solvent extraction when aluminum and manganese are extracted, the pH is preferably from 2.5 to 4.0, and more preferably from 2.8 to 3.3.

(Co Recovery Step)

The Mn extracted solution obtained in the Mn extraction step mainly contains cobalt and nickel, and the like. The Mn extracted solution is subjected to solvent extraction, preferably using a phosphonate ester-based extracting agent, and cobalt is extracted from the Mn extracted solution into a solvent.

As the phosphonate ester-based extracting agent, 2-ethylhexyl 2-ethylhexylphosphonate (trade name: PC-88A, lonquest 801) is preferable in terms of separation efficiency of nickel and cobalt.

In the solvent extraction in the Co recovery step, the pH is preferably from 4.5 to 5.5, and more preferably from 4.8 to 5.2.

The extracting agent (an organic phase) containing cobalt after the solvent extraction can be subjected to back extraction. Cobalt moved towards the aqueous phase side by back extraction is recovered by electrowinning.

Optionally, an electric cobalt obtained by electrowinning may be subjected to the following processing in order to increase its purity:

First, the electric cobalt is dissolved with sulfuric acid or acids of sulfuric acid, an oxidizing agent and the like. Thus, a cobalt solution containing at least cobalt ions is obtained. At this time, nickel that may be contained in the electric cobalt is also dissolved together with cobalt, so that the cobalt solution may also contain nickel ions.

A pH of the sulfuric acid acidic solution during dissolution can be, for example, from 1 to 5, and preferably from 2 to 4. If the pH is too high, the leaching of cobalt may be slow, and if the pH is too low, an amount of a pH adjusting agent added to the subsequent extraction step may be increased.

A cobalt concentration in the cobalt solution can be, for example, from 10 g/L to 150 g/L, preferably from 100 g/L to 130 g/L.

An extraction step is then carried out by a solvent extraction method in order to separate the cobalt ions from the nickel ions and the like to extract selectively the cobalt ions from the cobalt solution. An equilibrium pH during extraction is preferably from 4 to 7, but an appropriate pH range may be beyond that range, because the appropriate pH range varies depending on combinations of a cobalt concentration, a volume fraction of an extracting agent, a phase ratio of oil and water, a temperature, and the like. After the extraction, the organic phase containing cobalt ions is back-extracted using a back extracting solution such as an acidic aqueous solution of sulfuric acid, hydrochloric acid, nitric acid or the like.

In the extraction step, a masking agent for masking nickel ions and leaving them in the aqueous phase during the extraction may be added. The masking agent that can be used includes ammonia ions, $S_2O_3^{2-}$, EDTA and the like. Among them, the ammonia ions are effective. The ammonia ions may be added, for example, in the form of aqueous ammonia or ammonium chloride ($NH_4Cl$) and sodium hydroxide (NaOH).

The extracting agent to be brought into contact with the cobalt solution may be a phosphonic acid-based extracting agent or a phosphoric acid-based extracting agent, but it is preferably phosphinic acid-based extracting agents, and among them, it further preferably contains bis(2,4,4-trimethylpentyl)phosphinic acid. More particularly, ALBRITECT TH1 (trade name) or Cyanex 272 from SOLVAY are particularly preferable, although the present invention is not limited thereto.

Subsequently, in order to crystallize the cobalt ions contained in a back extracted solution, the back extracted solution is heated to, for example, 40° C. to 50° C. to concentrate it, and cobalt is crystallized in the form of a salt of sulfuric acid, hydrochloric acid, nitric acid or the like. Further, it may be commercialized in the form of a solution without being crystallized.

(Ni Recovery Step)

After the Co recovery step, the Co extracted solution obtained by the solvent extraction is preferably subjected to solvent extraction using a carboxylic acid-based extracting agent to separate nickel from the Co extracted solution. Examples of the carboxylic acid-based extracting agent include neodecanoic acid and naphthenic acid. Among them, neodecanoic acid is preferable in terms of an extraction ability of nickel.

In the solvent extraction in the Ni recovery step, the pH is preferably from 6.0 to 8.0, and more preferably from 6.8 to 7.2.

A nickel-containing extracting agent (organic phase) after the solvent extraction can be back-extracted with an acidic aqueous solution of sulfuric acid, hydrochloric acid, nitric acid or the like. Nickel that has moved to the aqueous phase side is recovered by electrowinning.

The electric nickel obtained by electrowinning is dissolved in an acid such as sulfuric acid, hydrochloric acid and nitric acid to obtain a solution in the form of a nickel salt of sulfuric acid, hydrochloric acid, nitric acid or the like. The resulting solution can be concentrated and crystallized to recover nickel as a solid salt of sulfuric acid, hydrochloric acid, nitric acid or the like. Further, the solution may be commercialized as it is without being crystallized.

This processing may be substantially the same as the processing of cobalt, with the exception that predetermined conditions can be changed in order to process nickel.

(Co/Ni Recovery Step)

The Co/Ni recovery step may be carried out instead of the Co recovery step and the Ni recovery step for separately recovering cobalt and nickel as described above.

In the Co/Ni recovery step, the neutralized solution obtained in the neutralization step or the Mn extracted solution obtained in the Mn extraction step is subjected to solvent extraction. Conditions in this case are such that both cobalt and nickel are extracted and back-extracted. Thus, after back-extraction with an acid of sulfuric acid, hydrochloric acid or nitric acid, a mixed solution of sulfuric acid, hydrochloric acid or nitric acid in which cobalt and nickel have been dissolved is obtained. The mixed solution can be optionally concentrated and crystallized to obtain a mixed salt of cobalt and nickel sulfates, hydrochlorides or nitrates.

EXAMPLES

The method for processing the positive electrode active material waste as described above was experimentally conducted and its effects were confirmed as described below. However, the description herein is merely for the purpose of illustration and is not intended to be limited thereto.

The positive electrode active material powder containing cobalt, nickel, manganese and lithium was mixed with graphite powder as carbon at varying proportions, and the mixture was roasted at different temperatures for 2 hours. The roasted powder obtained after roasting was added to water to dissolve lithium in the roasted powder in water. The results are shown in FIGS. 3 and 4.

Figure 3:
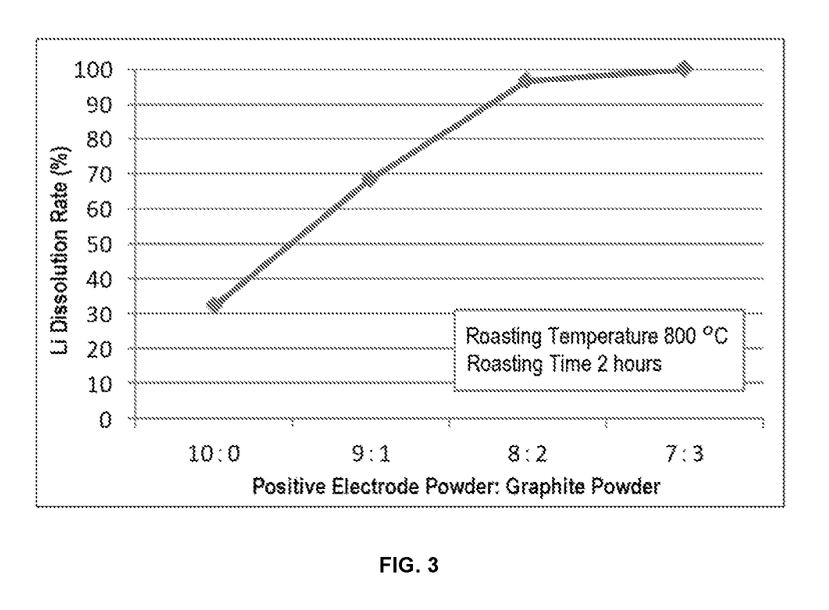
FIG. 3 is a graph showing a change in a Li dissolution rate with respect to a change in a mixing ratio of a mixture of each Example.

It is understood from FIG. 3 that a lithium dissolution rate is significantly increased as more carbon is mixed than an amount of the positive electrode active material powder: carbon of 9:1. In Particular, when the mixing ratio of the positive electrode active material and carbon was 8:2, it was confirmed that the positive electrode active material (composite oxide) was sufficiently decomposed to generate lithium carbonate. In this case, it is found from FIG. 3 that the lithium in the roasted powder is sufficiently dissolved in water.

Figure 4:
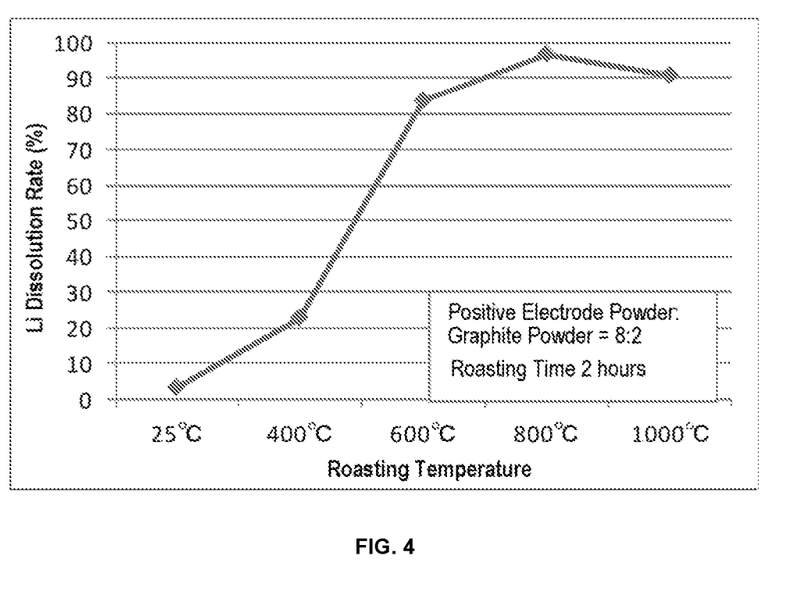
FIG. 4 is a graph showing a change in a Li dissolution rate with respect to a change in a roasting temperature of each Example.

Further, it is understood from FIG. 4 that the roasting temperature in the range of 600° C. to 800° C. leads to dissolution of a larger amount of lithium in the roasted powder. In addition, if the roasting temperature is 400° C., decomposition also proceeds over time, but in this case, a longer roasting time is required so that a processing efficiency is decreased.

The invention claimed is:

1. A method for processing positive electrode active material waste of lithium ion secondary batteries, the waste containing cobalt, nickel, manganese and lithium, the method comprising:
 a carbon mixing step of mixing the positive electrode active material waste in the form of powder with carbon to obtain a mixture having a ratio of a mass of carbon to a total mass of the positive electrode active material waste and the carbon of from 10% to 30%;
 a roasting step of roasting the mixture at a temperature of from 600° C. to 800° C. to obtain roasted powder;
 a lithium dissolution step including a first dissolution process of dissolving lithium in the roasted powder in water or a lithium-containing solution to produce a lithium solution, and a second dissolution process of dissolving the lithium in a residue obtained in the first dissolution process in water; and
 an acid leaching step of leaching a residue obtained in the lithium dissolution step with an acid.

2. The method for processing positive electrode active material waste according to claim 1, wherein the positive electrode active material waste further comprises at least one of aluminum and iron as an impurity, and
 wherein the method further comprises a neutralization step of neutralizing a leached solution obtained in the acid leaching step to separate at least a part of the impurity.

3. The method for processing positive electrode active material waste according to claim 2, further comprising a Mn extraction step of separating manganese from the leached solution obtained in the acid leaching step by solvent extraction.

4. The method for processing positive electrode active material waste according to claim 3,
 wherein the Mn extraction step comprises separating at least a part of the impurity from the leached solution by solvent extraction.

5. The method for processing positive electrode active material waste according to claim 3, further comprising a Co recovery step of extracting and back-extracting cobalt by solvent extraction from a neutralized solution obtained in the neutralization step or a Mn extracted solution obtained in the Mn extraction step to obtain electric cobalt by electrowinning.

6. The method for processing positive electrode active material waste according to claim 5, wherein the Co recovery step comprises dissolving the electric cobalt obtained by electrowinning in sulfuric acid, hydrochloric acid or nitric acid to recover cobalt in the form of a salt of sulfuric acid, hydrochloric acid or nitric acid.

7. The method for processing positive electrode active material waste according to claim 5, further comprising a Ni recovery step of extracting and back-extracting nickel by solvent extraction from a Co extracted solution obtained by extracting cobalt from the neutralized solution or the Mn extracted solution in the Co recovery step to obtain electrolytic nickel by electrowinning.

8. The method for processing positive electrode active material waste according to claim 7, wherein the Ni recovery step comprises dissolving the electrolytic nickel obtained by electrowinning in sulfuric acid, hydrochloric acid or nitric acid to recover nickel in the form of a salt of sulfuric acid, hydrochloric acid or nitric acid.

9. The method for processing positive electrode active material waste according to claim 3, further comprising a Co/Ni recovery step of extracting and back-extracting cobalt and nickel by solvent extraction from a neutralized solution obtained in the neutralization step or a Mn extracted solution obtained in the Mn extraction step to obtain a mixed solution of sulfuric acid, hydrochloric acid or nitric acid in which cobalt and nickel have been dissolved.

10. The method for processing positive electrode active material waste according to claim 1, wherein lithium in a lithium dissolved solution obtained in the lithium dissolution step is recovered as lithium carbonate or lithium hydroxide.

11. The method for processing positive electrode active material waste according to claim 1, wherein a lithium dissolved solution obtained in the lithium dissolution step is used as the lithium-containing solution for dissolving lithium in the roasted powder in the first dissolution process.

12. The method for processing positive electrode active material waste according to claim 1, wherein the first dissolution process is continued until a lithium concentration in the lithium solution reaches 2 g/L or more.

13. The method for processing positive electrode active material waste according to claim 1, further comprising a Mn extraction step of separating manganese from a leached solution obtained in the acid leaching step by solvent extraction.

14. The method for processing positive electrode active material waste according to claim 13,
 wherein the positive electrode active material waste further comprises at least one of aluminum and iron as an impurity, and
 wherein the Mn extraction step comprises separating at least a part of the impurity from the leached solution by solvent extraction.

* * * * *